United States Patent
Kobayashi et al.

(10) Patent No.: US 10,302,775 B2
(45) Date of Patent: May 28, 2019

(54) RADIATION DETECTOR AND RADIATION DETECTOR ASSEMBLY

(71) Applicant: Kabushiki Kaisha Toshiba, Minato-ku (JP)

(72) Inventors: Mitsuyoshi Kobayashi, Ota (JP); Satomi Taguchi, Ota (JP); Isao Takasu, Setagaya (JP); Rei Hasegawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/897,701

(22) Filed: Feb. 15, 2018

(65) Prior Publication Data

US 2019/0056515 A1  Feb. 21, 2019

(30) Foreign Application Priority Data

Aug. 21, 2017 (JP) .................. 2017-158406

(51) Int. Cl.
   *G01T 1/20* (2006.01)
   *G01T 3/06* (2006.01)

(52) U.S. Cl.
   CPC ............. *G01T 1/2018* (2013.01); *G01T 1/20* (2013.01); *G01T 1/2002* (2013.01); *G01T 3/06* (2013.01)

(58) Field of Classification Search
   CPC ..... G01T 1/242; G01T 1/2018; G01T 1/2002; G01T 3/06; G01T 1/20; H01L 27/14663
   See application file for complete search history.

(56) References Cited

U.S. PATENT DOCUMENTS

| | | | |
|---|---|---|---|
| 8,384,034 B2 | 2/2013 | Nakamura | |
| 2006/0151708 A1* | 7/2006 | Bani-Hashemi | G01T 1/2008 250/370.11 |
| 2008/0245968 A1* | 10/2008 | Tredwell | G01T 1/2018 250/370.09 |
| 2010/0308225 A1 | 12/2010 | Nakamura | |
| 2012/0205543 A1* | 8/2012 | Nakatsugawa | G01T 1/242 250/366 |
| 2012/0205544 A1* | 8/2012 | Nakatsugawa | G01T 1/242 250/367 |
| 2013/0119260 A1* | 5/2013 | Nakatsugawa | A61B 6/4208 250/366 |
| 2013/0140464 A1 | 6/2013 | Iwakiri et al. | |
| 2018/0277607 A1 | 9/2018 | Takasu et al. | |

FOREIGN PATENT DOCUMENTS

| | | |
|---|---|---|
| JP | 9-145845 | 6/1997 |
| JP | 4600947 | 12/2010 |
| JP | 2015-172590 | 10/2015 |

* cited by examiner

*Primary Examiner* — Kiho Kim
(74) *Attorney, Agent, or Firm* — Oblon, McClelland, Maier & Neustadt, L.L.P.

(57) ABSTRACT

According to an embodiment, a radiation detector includes a first scintillator, a second scintillator, and a photoelectric conversion element. The first scintillator converts radiation into light. The second scintillator converts radiation into light and has higher density than the first scintillator. The photoelectric conversion element is provided between the first scintillator and the second scintillator, and includes a photoelectric conversion layer converting light into electric charge.

19 Claims, 4 Drawing Sheets

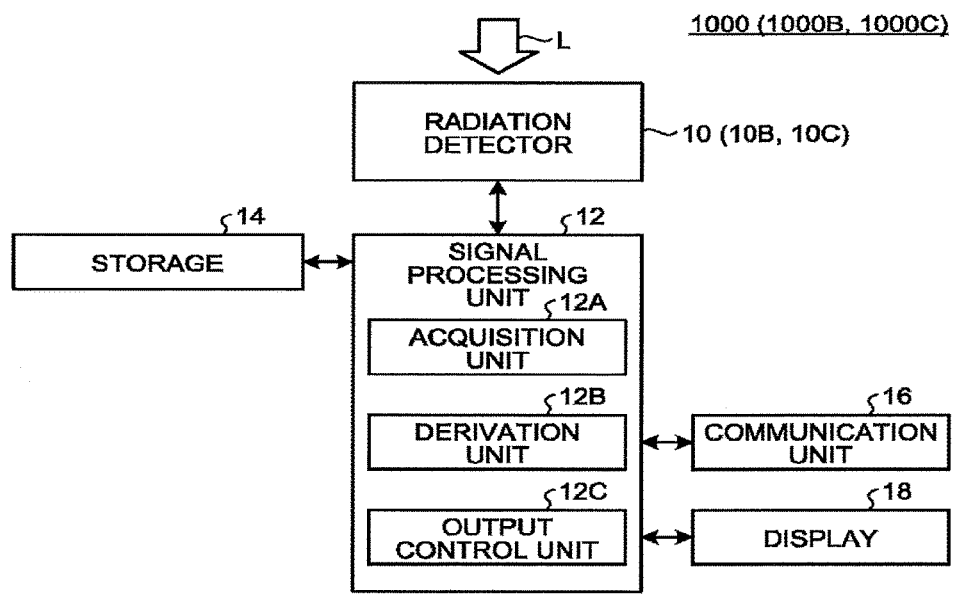
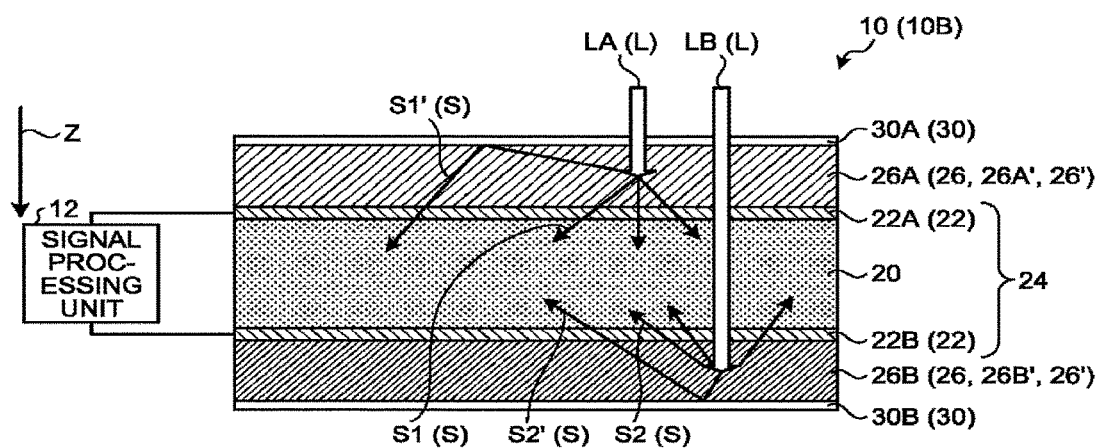

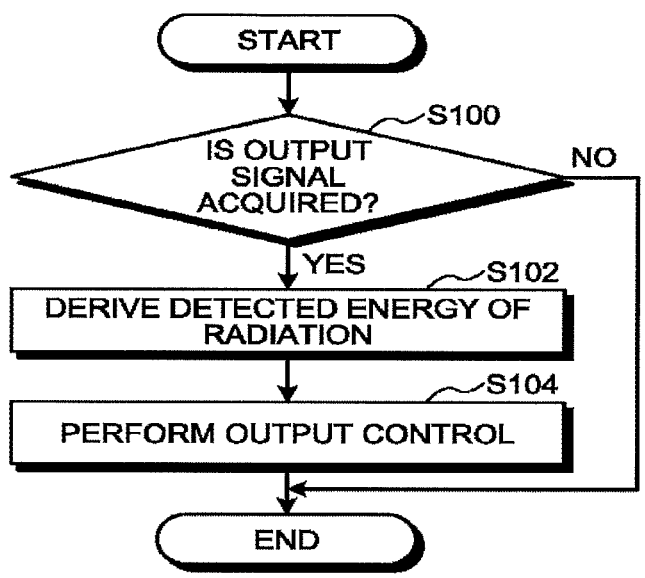

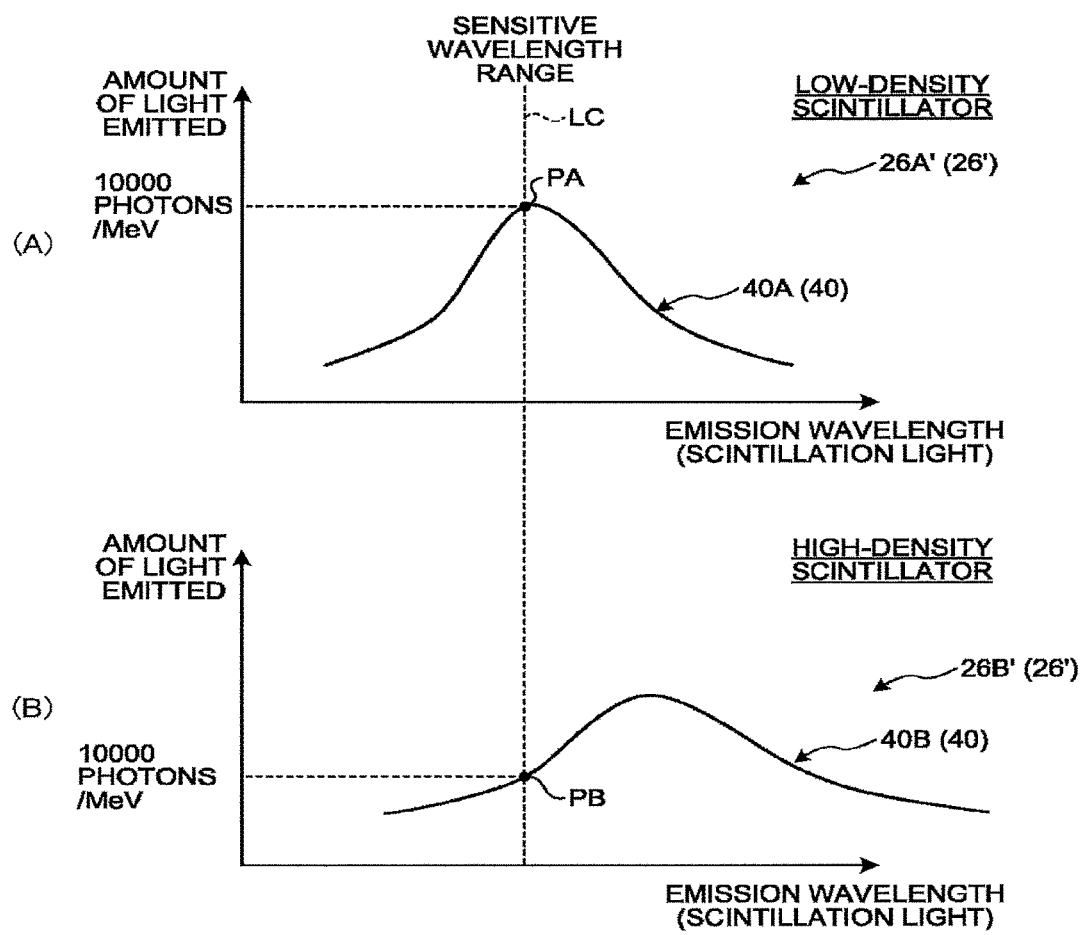

RADIATION DETECTOR AND RADIATION DETECTOR ASSEMBLY

CROSS-REFERENCE TO RELATED APPLICATIONS

This application is based upon and claims the benefit of priority from Japanese Patent Application No. 2017-158406, filed on Aug. 21, 2017; the entire contents of which are incorporated herein by reference.

FIELD

Embodiments described herein relate generally to a radiation detector and a radiation detector assembly.

BACKGROUND

There is known a radiation detector that detects electric charge converted by a photoelectric conversion layer. Such a detector is known, for example, to dispose the photoelectric conversion layer between a pair of electrode layers and read the electric charge converted by the photoelectric conversion layer via the electrodes.

The radiation incident on the photoelectric conversion layer may be backscattered in some cases. Such backscattering may reduce the accuracy of detecting radiation. There is thus disclosed a configuration in which an absorbing scintillator made of an organic material and a backscattering scintillator made of an inorganic material with a high backscattering rate are laminated to each other. However, a read circuit needs to be provided for each scintillator layer in the conventional technique, making it difficult to improve the accuracy of detecting the radiation easily.

BRIEF DESCRIPTION OF THE DRAWINGS

FIG. 1 is a schematic diagram of a radiation detector assembly;
FIG. 2 is a schematic diagram of a radiation detector;
FIG. 3 is a flowchart illustrating a procedure of information processing;
FIG. 4 is a schematic diagram of an emission spectrum.

DETAILED DESCRIPTION

Figure 5:
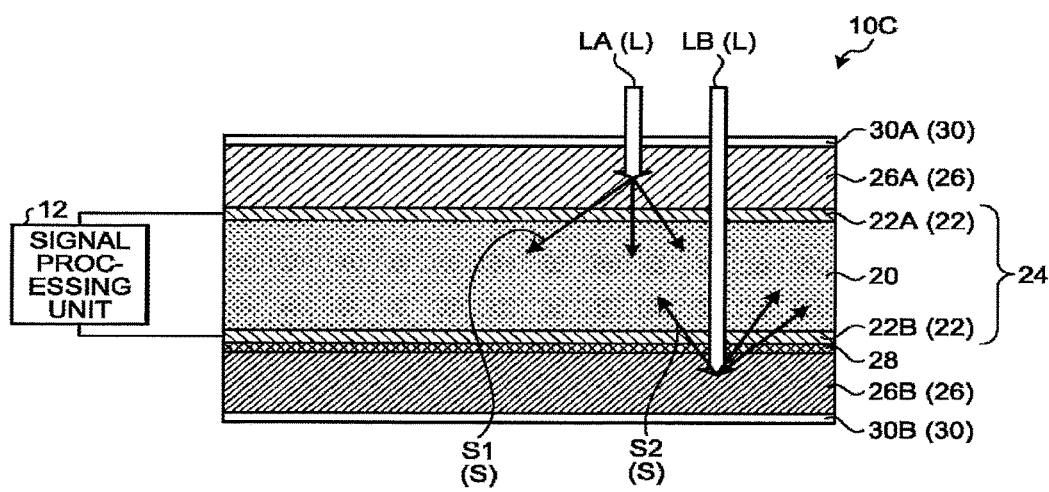
FIG. 5 is a schematic diagram of a radiation detector.

According to an embodiment, a radiation detector includes a first scintillator, a second scintillator, and a photoelectric conversion element. The first scintillator converts radiation into light. The second scintillator converts radiation into light and has higher density than the first scintillator. The photoelectric conversion element is provided between the first scintillator and the second scintillator, and includes a photoelectric conversion layer converting light into electric charge.

The present embodiment will now be described in detail with reference to the drawings.

First Embodiment

FIG. 1 is a schematic diagram illustrating an example of a radiation detector assembly 1000 according to the present embodiment.

The radiation detector assembly 1000 includes a radiation detector 10, a signal processing unit 12, a storage 14, a communication unit 16, and a display 18. The radiation detector 10, the storage 14, the communication unit 16, and the display 18 are connected to the signal processing unit 12 to be able to exchange data and signals therewith.

The radiation detector 10 outputs an output signal corresponding to incident radiation L. Using the output signal acquired from the radiation detector 10, the signal processing unit 12 derives detected energy of the radiation L incident on the radiation detector 10.

The storage 14 stores various data. The communication unit 16 communicates with an external device via a network or the like. In the present embodiment, the communication unit 16 transmits information indicating a derived result obtained by the signal processing unit 12 to the external device. The display 18 displays various images. In the present embodiment, the display 18 displays the information indicating the derived result obtained by the signal processing unit 12.

Note that the radiation detector assembly 1000 may include either the display 18 or the communication unit 16. The units making up the radiation detector assembly 1000 may be housed in one casing or may be divided and disposed in a plurality of casings.

Radiation Detector 10

The radiation detector 10 will be described first.

FIG. 2 is a schematic diagram illustrating an example of the radiation detector 10.

The radiation detector 10 is a laminate of a photoelectric conversion element 24, a scintillator 26, and a reflective layer 30. Note that the radiation detector 10 may be configured without the reflective layer 30.

The scintillator 26 includes a first scintillator 26A and a second scintillator 26B.

The photoelectric conversion element 24 is disposed between the scintillator 26 (the first scintillator 26A and the second scintillator 26B). Note that the first scintillator 26A and the second scintillator 26B will be referred to as the scintillator 26 when described collectively.

The scintillator 26 converts the radiation L into light such as scintillation light S. That is, the first scintillator 26A and the second scintillator 26B convert the radiation L into the scintillation light S. In other words, the first scintillator 26A and the second scintillator 26B convert the radiation L into the scintillation light S (photons) having a longer wavelength (lower energy) than the radiation L.

The scintillator 26 is made of a scintillator material. The scintillator material emits scintillation light (fluorescence) upon incidence of the radiation L thereon. The scintillator material includes, for example, $Lu_2SiO_5$ (Ce), $LaBr_3$ (Ce), cerium-doped yttrium aluminum perovskite (YAP (Ce)), cerium-doped lutetium aluminum perovskite (LuAP (Ce)), NaI (Tl), ZnS (Ag), cerium-doped gadolinium silicate (GSO (Ce)), CsI (Tl), $CeF_3$, $BaF_2$, LiI (Eu), LYSO (Ce) ($Lu_{2(1-x)}Y_{2x}SiO_5$), LGSO ($Lu_{2-x}Gd_{x2}SiO_5$), anthracene, stilbene, naphthalene, and diphenyloxazole (PPO).

In the present embodiment, the second scintillator 26B has higher density than the first scintillator 26A.

The density of the scintillator 26 is the weight per unit volume of the scintillator 26. That is, the weight per unit volume of the second scintillator 26B is heavier than the weight per unit volume of the first scintillator 26A.

The density ratio of the second scintillator 26B to the first scintillator 26A is, for example, preferably 2 or larger and 8 or smaller, more preferably 2.5 or larger and 6 or smaller, and particularly preferably 3 or larger and 5 or smaller.

A known method may be used to adjust the densities of the first scintillator 26A and the second scintillator 26B such that the scintillators satisfy the relationship of the above density ratio. The density may be adjusted by adjusting a type, a ratio, a crystal structure, and the like of the material making up each of the first scintillator 26A and the second scintillator 26B, for example.

The first scintillator 26A may use a scintillator material made of an organic material such as plastic, while the second scintillator 26B may use a scintillator material made of or primarily made of an inorganic material such as CsI, for example.

The second scintillator 26B need only have higher density than the first scintillator 26A so that the materials of the first scintillator 26A and the second scintillator 26B are not limited to the materials described above. For example, at least one of the first scintillator 26A and the second scintillator 26B may be made of either an organic scintillator material or an inorganic scintillator material. Alternatively, at least one of the first scintillator 26A and the second scintillator 26B may contain both an organic scintillator material and an inorganic scintillator material.

The first scintillator 26A and the second scintillator 26B need only satisfy the above density ratio, and thus the range of density of each scintillator is not limited. For example, the density of the first scintillator 26A is preferably 1.0 or higher and 1.7 or lower, and more preferably 1.03 or higher and 1.25 or lower. The density of the second scintillator 26B is preferably 2.5 or higher and 10.0 or lower, and more preferably 4.0 or higher and 8.5 or lower.

The thickness of the scintillator 26 is not limited. Moreover, the thicknesses of the first scintillator 26A and the second scintillator 26B may be the same or different. The thickness of the first scintillator 26A is preferably adjusted to a range of 0.05 mm or larger and 30 mm or smaller, for example. The thickness of the second scintillator 26B is preferably adjusted to a range of 0.05 mm or larger and 30 mm or smaller, for example.

The type of the radiation L converted into the scintillation light S by the scintillator 26 is not limited. The type of the radiation L converted into the scintillation light S by the scintillator 26 is at least one of a β ray, a heavy ion beam, an α ray, a neutron beam, and a γ ray, for example. In the present embodiment, the scintillator 26 is preferably configured to convert the β ray or γ ray into the scintillation light S, and is particularly preferably configured to convert the β ray into the scintillation light S.

The type of the radiation L converted into the scintillation light S by the scintillator 26 can be adjusted by changing the material of the scintillator 26 as well as the ratio, thickness, and the like of the material.

In the present embodiment, the first scintillator 26A is disposed upstream of the second scintillator 26B in the direction of incidence of the radiation L (refer to the direction of arrow Z, which is hereinafter referred to as an incident direction Z). That is, the first scintillator 26A is disposed upstream of the photoelectric conversion element 24 in the incident direction Z of the radiation L. On the other hand, the second scintillator 26B is disposed downstream of the photoelectric conversion element 24 in the incident direction Z of the radiation L.

That is, in the present embodiment, the scintillator 26 (the first scintillator 26A) having low density is disposed upstream of the scintillator 26 (the second scintillator 26B) having high density in the incident direction Z of the radiation L.

The incident direction Z of the radiation L coincides with the thickness direction of the radiation detector 10. Moreover, the thickness direction coincides with the stacking direction of the plurality of layers (including the reflective layer 30, the scintillator 26, an electrode layer 22, and the photoelectric conversion layer 20) forming the radiation detector 10.

The photoelectric conversion element 24 will now be described.

The photoelectric conversion element 24 is disposed between the pair of scintillators 26 (the first scintillator 26A and the second scintillator 26B).

The photoelectric conversion element 24 is a laminate of the electrode layer 22 and the photoelectric conversion layer 20. The electrode layer 22 includes an electrode layer 22A and an electrode layer 22B. The electrode layer 22A and the electrode layer 22B are electrically connected to the signal processing unit 12.

In the present embodiment, the photoelectric conversion layer 20 is disposed between the pair of electrode layers 22 (the electrode layer 22A and the electrode layer 22B). At least one of the electrode layer 22A and the electrode layer 22B is preferably disposed in contact with the photoelectric conversion layer 20. Note that the electrode layer 22A and the electrode layer 22B will be referred to as the electrode layer 22 when described collectively.

The electrode layer 22 is conductive and transmits light incident on the electrode layer 22. The term "transmit" means to transmit 50% or more, preferably 80% or more, of the incident light. The light incident on the electrode layer 22 is the radiation L and the scintillation light S.

The electrode layer 22 is made of a conductive material. The electrode layer 22 is made of indium tin oxide (ITO), graphene, ZnO, aluminum, or gold, for example. The thickness of the electrode layer 22 is not limited. The thickness of the electrode layer 22 is, for example, 35 nm.

The photoelectric conversion layer 20 converts the scintillation light S into electric charge. That is, in the present embodiment, the photoelectric conversion layer 20 defines light in at least a part of the wavelength range of the scintillation light S as a sensitive wavelength range. Note that the sensitive wavelength range of the photoelectric conversion layer 20 may be a wavelength range having a specific range or may be one wavelength.

The photoelectric conversion layer 20 may have wavelength selectivity. The wavelength selectivity means to transmit light having a wavelength outside the sensitive wavelength range subjected to photoelectric conversion. For example, the photoelectric conversion layer 20 may have different wavelength selectivity in the thickness direction (the direction of arrow Z). In this case, the photoelectric conversion layer 20 may contain quinacridone or subphthalocyanine, for example.

The photoelectric conversion layer 20 may be made of a material that converts the scintillation light S into electric charge. For example, the photoelectric conversion layer 20 is mainly made of an inorganic material such as amorphous silicon or an organic material. The term "mainly made of" means that the percentage content of the material is 70% or higher.

Preferably, the photoelectric conversion layer 20 is mainly made of an organic material in terms of cost reduction of the raw material, flexibility, ease of formation, a high absorption coefficient, weight reduction, impact resistance, and the like. That is, the photoelectric conversion layer 20 is preferably an organic photoelectric conversion layer.

The photoelectric conversion layer 20 mainly made of an organic material can have higher resistivity than when the photoelectric conversion layer 20 is not made mainly of the organic material. Higher resistivity of the photoelectric conversion layer 20 can more successfully prevent the electric charge generated in the photoelectric conversion layer 20 from spreading to a region corresponding to another pixel region in the photoelectric conversion layer 20. In other words, the radiation detector 10 in this case can prevent electric charge from entering each pixel region from another pixel region.

Note that the region corresponding to the pixel region in the photoelectric conversion layer 20 may be defined in advance by adjusting the arrangement of the electrode layer 22 (the electrode layer 22A and the electrode layer 22B) and the like.

The organic material used for the photoelectric conversion layer 20 is selected from at least one of a polyphenylene vinylene (PPV) derivative and a polythiophene-based polymer material, for example.

The polyphenylene vinylene derivative is, for example, poly [2-methoxy, 5-(2'-ethyl-hexyloxy)-p-phenylene-vinylene](MEH-PPV). The polythiophene-based polymer material is, for example, poly (3-alkylthiophene) such as poly (3-hexylthiophene) (P3HT) or dioctylfluorene-bithiophene copolymer (F8T2).

The photoelectric conversion layer 20 is particularly preferably made of P3HT or F8T2.

The photoelectric conversion layer 20 may be a mixture of an organic material and an inorganic material. In this case, for example, the photoelectric conversion layer 20 may be a mixture of the organic material and fullerene, a fullerene derivative, a carbon nanotube (CNT) having semiconductivity, a CNT compound, or the like.

The fullerene derivative is, for example, [6,6]-phenyl C61 butyric acid methyl ester (PCBM), a fullerene dimer, or a fullerene compound into which alkali metal or alkaline earth metal is introduced. The CNT is, for example, a carbon nanotube containing fullerenes or endohedral metallofullerenes. Moreover, the CNT is a CNT compound obtained by adding various molecules to the side wall and the tip of the CNT.

In this case, the photoelectric conversion layer 20 may be a mixture of PCBM and P3HT mixed in a weight ratio of 10:1 or higher and 1:10 or lower, or a mixture of PCBM and F8T2 mixed in a weight ratio of 10:1 or higher and 1:10 or lower.

The reflective layer 30 will now be described.

The reflective layer 30 includes a reflective layer 30A and a reflective layer 30B. Note that the reflective layer 30A and the reflective layer 30B will be referred to as the reflective layer 30 when described collectively.

The reflective layer 30A is disposed upstream of the first scintillator 26A in the incident direction Z of the radiation L. In other words, the reflective layer 30A is provided on a side of the first scintillator 26A opposite to a side thereof on which the photoelectric conversion element 24 is provided.

The reflective layer 30B is disposed downstream of the second scintillator 26B in the incident direction Z of the radiation L. In other words, the reflective layer 30B is provided on a side of the second scintillator 26B opposite to a side thereof on which the photoelectric conversion element 24 is provided.

That is, in the present embodiment, the laminate of the second scintillator 26B, the photoelectric conversion element 24, and the first scintillator 26A is disposed between the pair of reflective layers 30 (the reflective layer 30A and the reflective layer 30B).

Note that the radiation detector 10 is not limited to the configuration including the pair of reflective layers 30 (the reflective layer 30A and the reflective layer 30B) as described above. The radiation detector 10 may be configured to include only one of the reflective layer 30A and the reflective layer 30B. Alternatively, the radiation detector 10 may be configured to not include at least one of the reflective layer 30A and the reflective layer 30B. Specifically, the radiation detector 10 may be configured to not include the reflective layer 30 (the reflective layer 30A and the reflective layer 30B).

The reflective layer 30 transmits the radiation L and reflects at least a part of the scintillation light S. Reflecting at least a part of the scintillation light means to reflect 70% or more of the scintillation light S reaching the reflective layer 30.

The reflective layer 30 may be made of a material that satisfies the above characteristics. For example, the reflective layer 30 is made of barium sulfate, aluminum oxide, titanium oxide, aluminum, or titanium.

The thickness of the reflective layer 30 is not limited as long as the thickness satisfies the above characteristics.

Function of Radiation Detector 10

The function of the radiation detector 10 will now be described.

The radiation L enters the radiation detector 10 and reaches the first scintillator 26A. The first scintillator 26A is the scintillator 26 having lower density than the second scintillator 26B. The first scintillator 26A thus converts radiation LA of lower energy than that converted by the second scintillator 26B into scintillation light S1. On the other hand, radiation LB of higher energy is transmitted through the first scintillator 26A.

The scintillation light S1 converted by the first scintillator 26A reaches the photoelectric conversion layer 20.

On the other hand, the radiation LB transmitted through the first scintillator 26A is transmitted through the photoelectric conversion layer 20 to reach the second scintillator 26B. The second scintillator 26B converts the radiation LB of higher energy than that converted by the first scintillator 26A into scintillation light S2.

The scintillation light S2 converted by the second scintillator 26B reaches the photoelectric conversion layer 20.

Therefore, the photoelectric conversion layer 20 receives both the scintillation light S1 corresponding to the radiation LA of lower energy converted by the first scintillator 26A, and the scintillation light S2 corresponding to the radiation LB of higher energy converted by the second scintillator 26B.

Thus, in the radiation detector 10 of the present embodiment, the photoelectric conversion layer 20 can convert almost all the energy of the radiation L incident on the radiation detector 10 into electric charge.

As a result, the radiation detector 10 of the present embodiment can easily improve the accuracy of detecting the radiation L.

Both the scintillation light S1 and the scintillation light S2 enter the photoelectric conversion layer 20 as described above. The radiation detector 10 of the present embodiment can thus improve the rate of detection of the radiation L in addition to obtaining the above effect.

In the present embodiment, the first scintillator 26A is provided upstream of the second scintillator 26B in the incident direction Z of the radiation L, as described above.

Thus in the present embodiment, the first scintillator 26A having low density is disposed upstream of the second scintillator 26B having high density in the incident direction Z of the radiation L.

Accordingly, the radiation L incident on the radiation detector 10 enters the first scintillator 26A having low density before entering the second scintillator 26B having high density. The radiation detector 10 of the present embodiment can thus prevent backscattering of the radiation L by the first scintillator 26A. The radiation LB of higher energy passing through the first scintillator 26A and the photoelectric conversion layer 20 is converted into the scintillation light S2 by the second scintillator 26B.

Thus, in the radiation detector 10 of the present embodiment, the photoelectric conversion layer 20 can convert almost all the energy of the radiation L incident on the radiation detector 10 into electric charge.

The radiation detector 10 of the present embodiment can further include at least one of the reflective layer 30A and the reflective layer 30B, as described above. The reflective layer 30A is provided on the side of the first scintillator 26A opposite to the side thereof on which the photoelectric conversion element 24 is provided. The reflective layer 30B is provided on the side of the second scintillator 26B opposite to the side thereof on which the photoelectric conversion element 24 is provided.

Thus, of the scintillation light S1 converted by the first scintillator 26A, scintillation light S1' reaching the reflective layer 30A is reflected by the reflective layer 30A to reach the photoelectric conversion layer 20. Of the scintillation light S2 converted by the reflective layer 30B, scintillation light S2' reaching the reflective layer 30B is reflected by the reflective layer 30B to reach the photoelectric conversion layer 20.

As a result, with the reflective layer 30 being provided, the photoelectric conversion layer 20 can further convert almost all the energy of the radiation L incident on the radiation detector 10 into electric charge.

Signal Processing Unit 12

Returning to FIG. 1, the description will be continued. The signal processing unit 12 will now be described.

The signal processing unit 12 is electrically connected to the radiation detector 10, the storage 14, the communication unit 16, and the display 18 as described above.

The signal processing unit 12 performs signal processing on the output signal output from the radiation detector 10. The signal processing unit 12 includes an acquisition unit 12A, a derivation unit 12B, and an output control unit 12C. The acquisition unit 12A, the derivation unit 12B, and the output control unit 12C are implemented by one or a plurality of processors, for example. Each of the above units may for example be implemented by causing a processor such as a central processing unit (CPU) to execute a program, or by software. Alternatively, each of the above units may be implemented by a processor such as a dedicated integrated circuit (IC), or by hardware. Yet alternatively, each of the above units may be implemented by using software and hardware in combination. When a plurality of processors is used, each processor may implement one of the above units or two or more of the above units.

The acquisition unit 12A acquires the output signal from the radiation detector 10.

The output signal is a signal indicating the amount of electric charge converted by the photoelectric conversion layer 20. In other words, the output signal is the detected energy of the radiation L detected by the photoelectric conversion layer 20. The signal processing unit 12 converts the amount of electric charge detected by the photoelectric conversion layer 20 into a signal that can be measured by a charge amplifier or the like, and further performs analog-to-digital (A/D) conversion on the signal to obtain an output signal. Note that in order to simplify the explanation, the present embodiment assumes that the signal processing unit 12 accepts the output signal from the photoelectric conversion layer 20.

The derivation unit 12B derives the detected energy of the radiation L on the basis of the output signal acquired by the acquisition unit 12A. For example, the derivation unit 12B derives the detected energy of the radiation L by using a conversion table stored in the storage 14.

The conversion table is a table in which the output signal is associated with incident energy of the radiation L. For example, the radiation detector 10 used for detection is used to measure in advance the incident energy of the radiation L incident on the radiation detector 10 and the output signal output from the radiation detector 10. The signal processing unit 12 stores in advance the conversion table indicating the relationship between the output signal and the incident energy of the radiation L in the storage 14.

Note that the signal processing unit 12 may prepare the conversion table in advance by simulation. Alternatively, the signal processing unit 12 may prepare the conversion table in advance by Monte Carlo simulation or the like at the time of activation or calibration of the radiation detector assembly 1000. The conversion table may also be prepared by an external device or the like. The storage 14 then stores the conversion table in advance.

The conversion table may be in any form indicating the relationship between the incident energy of the radiation L incident on the radiation detector 10 and the output signal, and thus may be any of a table, a function, a diagram, and a database.

The signal processing unit 12 may prepare a conversion table in advance for each type of the radiation L to be detected and store the conversion table in the storage 14.

For example, the signal processing unit 12 may prepare in advance a conversion table corresponding to each of a β ray, a γ ray, a heavy ion beam, an α ray, and a neutron beam and store the table in the storage 14. In this case, the conversion table may be prepared by selectively irradiating the radiation detector 10 with each type of the radiation L and measuring in advance the relationship between the incident energy of each type of the radiation L and the output signal. The signal processing unit 12 may thus prepare a conversion table in advance for each type of the radiation L and store the table into the storage 14 in advance.

The derivation unit 12B derives the incident energy corresponding to the output signal acquired by the acquisition unit 12A in the conversion table as the detected energy of the radiation L detected by the radiation detector 10.

The derivation unit 12B can also derive the detected energy of a specific type of the radiation L detected by the radiation detector 10 by using the conversion table corresponding to the specific type of the radiation L.

The derivation unit 12B may derive the detected energy of any type of the radiation L. Preferably, the derivation unit 12B derives the detected energy of a β ray in particular. In this case, the derivation unit 12B may derive the detected energy of the β ray by using the conversion table corresponding to the β ray as the type of the radiation L.

The output control unit 12C performs control to output information indicating the derived result obtained by the derivation unit 12B to the communication unit 16 and the display 18.

Next, an example of a procedure of information processing executed by the signal processing unit 12 will be described. FIG. 3 is a flowchart illustrating an example of the procedure of the information processing executed by the signal processing unit 12.

First, the signal processing unit 12 determines whether or not an output signal is acquired by the acquisition unit 12A from the photoelectric conversion layer 20 of the radiation detector 10 (step S100). The routine ends if the determination made in step S100 is negative (step S100: No). The routine proceeds to step S102 if the determination made in step S100 is affirmative (step S100: Yes).

In step S102, the derivation unit 12B derives detected energy of radiation L by using the output signal acquired in step S100 and a conversion table (step S102).

For example, the derivation unit 12B specifies the type of the radiation L to be detected. The type of the radiation L to be detected may be accepted from an external device via the communication unit 16 or from an input unit operated by a user.

The derivation unit 12B then reads, from the storage 14, a conversion table corresponding to the type of the radiation L specified. For example, the derivation unit 12B reads a conversion table corresponding to a β ray from the storage 14. The derivation unit 12B then reads, from the conversion table being read, incident energy of the radiation L corresponding to the output signal that is acquired in step S100. Then, the derivation unit 12B derives the incident energy being read as the detected energy of the radiation L (such as the β ray) detected by the radiation detector 10.

Next, the output control unit 12C performs control to output information indicating the derived result identified in step S102 to the communication unit 16 and the display 18 (step S104). The processing of step S104 causes the communication unit 16 to transmit the information indicating the derived result to an external device. The processing of step S104 also causes the display 18 to display the information indicating the derived result. The routine ends thereafter.

As described above, the radiation detector 10 of the present embodiment includes the first scintillator 26A, the second scintillator 26B, and the photoelectric conversion element 24. The first scintillator 26A converts the radiation L into the scintillation light S. The second scintillator 26B converts the radiation L into the scintillation light S. The second scintillator 26B has higher density than the first scintillator 26A. The photoelectric conversion element 24 is provided between the first scintillator 26A and the second scintillator 26B. The photoelectric conversion element 24 includes the photoelectric conversion layer 20. The photoelectric conversion layer 20 converts the scintillation light S into electric charge.

As a result, the radiation detector 10 of the present embodiment can easily improve the accuracy of detecting the radiation L.

Note that the β ray is preferably the type of the radiation L to be detected by the radiation detector assembly 1000, as described above.

The β ray particularly has a high probability of the occurrence of backscattering among the types of the radiation L. The photoelectric conversion layer 20 of the present embodiment has the unique configuration as described above to be able to prevent backscattering of the β ray and improve the rate of detection thereof.

In the radiation detector 10 of the present embodiment, the photoelectric conversion layer 20 is disposed between the pair of electrode layers 22 (the electrode layer 22A and the electrode layer 22B). These electrode layers 22 are electrically connected to the signal processing unit 12. The photoelectric conversion element 24 is disposed between the pair of scintillators 26 (the first scintillator 26A and the second scintillator 26B).

The radiation detector 10 of the present embodiment may thus include the electrode layer 22 for each photoelectric conversion layer 20 without including a detector for each scintillator 26. As a result, the radiation detector 10 of the present embodiment can easily improve the accuracy of detecting the radiation L with the simple configuration, in addition to obtaining the above effect.

The radiation detector 10 of the present embodiment disposes the two scintillators 26 (the first scintillator 26A and the second scintillator 26B) for the one photoelectric conversion layer 20. The radiation detector 10 of the present embodiment can thus detect photons of the scintillation light S with high efficiency in addition to obtaining the above effect.

Second Embodiment

A scintillator 26 of a radiation detector 10 may have more unique characteristics in addition to the characteristics of the above embodiment.

FIG. 1 is a schematic diagram illustrating an example of a radiation detector assembly 1000B. The radiation detector assembly 1000B has the same configuration as the radiation detector assembly 1000 of the first embodiment except for a radiation detector 10B included in place of the radiation detector 10. In the radiation detector assembly 1000B, a part having the same configuration as that of the radiation detector assembly 1000 is denoted by the same reference numeral as that used in the radiation detector assembly 1000B, and thus will not be described in detail.

FIG. 2 is a schematic diagram illustrating an example of the radiation detector 10B. The radiation detector 10B has the same configuration as the radiation detector 10 except for a scintillator 26' included in place of the scintillator 26.

The scintillator 26' is similar to the scintillator 26. The scintillator 26' includes a first scintillator 26A' and a second scintillator 26B'. The first scintillator 26A' is similar to the first scintillator 26A. The second scintillator 26B' is similar to the second scintillator 26B.

The first scintillator 26A' and the second scintillator 26B' have the following characteristics in addition to the characteristics of the first scintillator 26A and the second scintillator 26B. Note that the characteristics of the first scintillator 26A and the second scintillator 26B are that the radiation L is converted into the scintillation light S and that the first scintillator 26A has lower density than the second scintillator 26B.

In the present embodiment, an amount of the emitted scintillation light S per unit energy in a sensitive wavelength range of a photoelectric conversion layer 20 in the first scintillator 26A' is the same as that in the second scintillator 26B'.

The amounts of the emitted scintillation light are the same means that, when K represents the number of photons of the scintillation light S of the first scintillator 26A' per 1 MeV, the number of photons of the scintillation light S of the second scintillator 26B' falls in the range of 0.9K to 1.1K in the sensitive wavelength range of the photoelectric conversion layer 20.

The amount of the scintillation light S emitted per unit energy in the sensitive wavelength range of the photoelectric conversion layer 20 indicates the amount of emitted light per unit energy in the sensitive wavelength range of the photoelectric conversion layer 20 from among the wavelength range of the scintillation light S converted by the scintillator 26'.

The description will be made with reference to FIG. 4. FIG. 4 is a schematic diagram illustrating an example of an emission spectrum 40 of the scintillator 26'. The emission spectrum of the scintillator 26' is represented by the amount of emitted light per unit energy with respect to the emission wavelength of the scintillation light S.

FIG. 4 schematically illustrates an example of an emission spectrum 40A of the first scintillator 26A' at (A). FIG. 4 schematically illustrates an example of an emission spectrum 40B of the second scintillator 26B' at (B).

As illustrated in FIG. 4, an amount of the scintillation light S per unit energy in a sensitive wavelength range LC of the photoelectric conversion layer 20 in the first scintillator 26A' is the same (10000 photons/MeV) as that in the second scintillator 26B' (refer to points of intersection PA and PB). Note that the value of the same amount of emitted light is not limited to 10000 photons/MeV.

In the present embodiment, the first scintillator 26A' and the second scintillator 26B' are adjusted in advance such that the amount of the emitted scintillation light S per unit energy in the sensitive wavelength range LC in the first scintillator 26A' is the same as that in the second scintillator 26B'.

Note that a known method may be used as a method of adjusting the first scintillator 26A' and the second scintillator 26B' such that the amount of the emitted scintillation light S per unit energy in the sensitive wavelength range LC of the photoelectric conversion layer 20 in the first scintillator 26A' is the same as that in the second scintillator 26B'.

For example, a type, a ratio, a crystal structure, and the like of the material making up each of the first scintillator 26A' and the second scintillator 26B' are adjusted. The first scintillator 26A' and the second scintillator 26B' may thus be adjusted to satisfy a density ratio relationship similar to that between the first scintillator 26A and the second scintillator 26B as well as to satisfy the above relationship of the amount of light emitted.

Specifically, the first scintillator 26A' may be made of CsI (Tl) and the second scintillator 26B' may be made of anthracene, for example.

Note that the first scintillator 26A' and the second scintillator 26B' may have the emission spectra 40 different from each other. The different emission spectra 40 means different shapes, peak positions, and the like of the emission spectra.

Specifically, as illustrated in FIG. 4, the emission spectra 40 may be different in that the emission spectrum 40B (see (B) in FIG. 4) of the second scintillator 26B' is represented by a broader curve than the emission spectrum 40A (see (A) in FIG. 4) of the first scintillator 26A' with the peak positions of the spectra being different from each other.

Thus, even when the emission spectra 40 are different, the first scintillator 26A' and the second scintillator 26B' may be adjusted such that the amount of the emitted scintillation light S per unit energy in the sensitive wavelength range LC of the photoelectric conversion layer 20 in the first scintillator 26A' is the same as that in the second scintillator 26B'.

Returning to FIG. 1, the description will be continued. A signal processing unit 12 will now be described. The radiation detector assembly 1000B is similar to the radiation detector assembly 1000 except for the radiation detector 10B included in place of the radiation detector 10. The signal processing unit 12 may thus perform processing similar to that of the first embodiment.

In the radiation detector 10B of the present embodiment, the amount of the emitted scintillation light S per unit energy in the sensitive wavelength range LC of the photoelectric conversion layer 20 in the first scintillator 26A' is the same as that in the second scintillator 26B', as described above.

It is assumed, for example, that the radiation detector 10B is irradiated with the radiation L of 1 MeV. The photoelectric conversion layer 20 in this case receives, from each of the first scintillator 26A' and the second scintillator 26B', the same amount of the scintillation light S (such as the amount corresponding to 100 photons) in the sensitive wavelength range LC that can be converted into electric charge by the photoelectric conversion layer 20.

The signal processing unit 12 can thus easily identify the relationship between an output signal indicating the electric charge converted by the photoelectric conversion layer 20 and incident energy of the radiation L with which the radiation detector 10 is irradiated. That is, the signal processing unit 12 can easily identify the relationship between the amount of the scintillation light S in the sensitive wavelength range LC being emitted and the incident energy of the radiation L.

Therefore, the radiation detector assembly 1000B can more easily derive the detected energy of the radiation L on the basis of the output signal output from the photoelectric conversion layer 20, in addition to obtaining the effects of the first embodiment.

Third Embodiment

The configuration of the radiation detector 10 is not limited to the configuration illustrated in FIG. 2. The radiation detector 10 may further include a light attenuating layer.

FIG. 1 is a schematic diagram illustrating an example of a radiation detector assembly 1000C. The radiation detector assembly 1000C has the same configuration as the radiation detector assembly 1000 of the first embodiment except for a radiation detector 10C included in place of the radiation detector 10. In the radiation detector assembly 1000C, a part having the same configuration as that of the radiation detector assembly 1000 is denoted by the same reference numeral as that used in the radiation detector assembly 1000C, and thus will not be described in detail.

FIG. 5 is a schematic diagram illustrating an example of the radiation detector 10C according to the present embodiment. In the radiation detector 10C, a part indicating the same configuration as that of the radiation detector 10 is denoted by the same reference numeral as that used in the radiation detector 10, and thus will not be described in detail.

The radiation detector 10C is configured such that a light attenuating layer 28 is further included in the radiation detector 10.

The light attenuating layer 28 is disposed at least between a first scintillator 26A and a photoelectric conversion element 24 or between a second scintillator 26B and the photoelectric conversion element 24.

FIG. 5 illustrates, as an example, a mode in which the light attenuating layer 28 is disposed between the photoelectric conversion element 24 and the second scintillator 26B.

The light attenuating layer 28 partially attenuates the amount of scintillation light S incident thereon. To partially attenuate the amount of light means to attenuate the light to 20% or more and 80% or less from 100% which is the amount of the scintillation light S made incident.

Specifically, the light attenuating layer 28 partially attenuates the scintillation light S made incident such that the amount of scintillation light S1 per unit energy reaching a photoelectric conversion layer 20 from the first scintillator 26A is equal to the amount of scintillation light S2 per unit energy reaching the photoelectric conversion layer 20 from the second scintillator 26B.

The equal amount of light per unit energy means that, when K' represents the number of photons of the scintillation light S per 1 MeV reaching the photoelectric conversion layer 20 from the first scintillator 26A, the number of photons per 1 MeV of the scintillation light S reaching the photoelectric conversion layer 20 from the second scintillator 26B falls in the range of 0.9K' to 1.1K' in a sensitive wavelength range of the photoelectric conversion layer 20.

The material forming the light attenuating layer 28 and the thickness thereof are not limited as long as the above characteristics can be realized. For example, the light attenuating layer 28 may be formed by dispersing a light-shielding material or a light-absorbing material in a transparent resin. The light-shielding material and the light-absorbing material include carbon black and iodine, but are not limited thereto.

As described above, FIG. 5 illustrates as an example the mode in which the light attenuating layer 28 is disposed between the photoelectric conversion element 24 and the second scintillator 26B. Such mode is illustrated because it is assumed that the amount of the emitted scintillation light S per unit energy in the second scintillator 26B is larger than that in the first scintillator 26A. The light attenuating layer 28 may thus be disposed at least between the first scintillator 26A and the photoelectric conversion element 24 or between the second scintillator 26B and the photoelectric conversion element 24 depending on the amounts of emitted light per unit energy in the first scintillator 26A and the second scintillator 26B.

Note that the first scintillator 26A and the second scintillator 26B may have emission spectra 40 different from each other as with the second embodiment.

Returning to FIG. 1, the description will be continued. A signal processing unit 12 will now be described. The radiation detector assembly 1000C is similar to the radiation detector assembly 1000 except for the radiation detector 10C included in place of the radiation detector 10. The signal processing unit 12 may thus perform processing similar to that of the first embodiment.

The radiation detector 10C of the present embodiment further includes the light attenuating layer 28 as described above. The light attenuating layer 28 is disposed at least between the first scintillator 26A and the photoelectric conversion element 24 or between the second scintillator 26B and the photoelectric conversion element 24. The light attenuating layer 28 partially attenuates the amount of the scintillation light S.

As a result, in the radiation detector 10C, the amount of the scintillation light S per unit energy incident on the photoelectric conversion layer 20 from the first scintillator 26A is substantially equal to the amount of the scintillation light S per unit energy incident on the photoelectric conversion layer 20 from the second scintillator 26B.

Therefore, the radiation detector assembly 1000C can more easily derive the detected energy of radiation L on the basis of an output signal output from the photoelectric conversion layer 20, in addition to obtaining the effects of the first embodiment as with the second embodiment.

Moreover, the photoelectric conversion layer 20 can detect the scintillation light from the first scintillator 26A and the scintillation light from the second scintillator 26B without distinction. In the present embodiment, the amount of the scintillation light S per unit energy incident on the photoelectric conversion layer 20 from the first scintillator 26A is substantially equal to the amount of the scintillation light S per unit energy incident on the photoelectric conversion layer 20 from the second scintillator 26B. The present embodiment thus need not include two detectors corresponding to the first scintillator 26A and the second scintillator 26B.

Hardware Configuration

Figure 6:
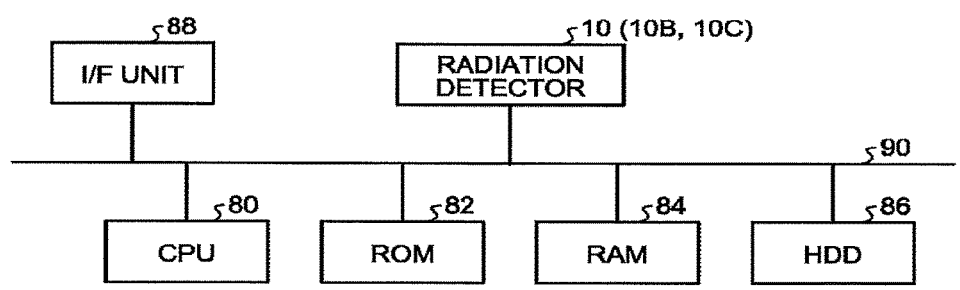
FIG. 6 is a block diagram of an example of a hardware configuration.

A hardware configuration of each of the radiation detector assemblies 1000, 1000B, and 1000C according to the above embodiments will now be described. FIG. 6 is a block diagram illustrating an example of the hardware configuration of each of the radiation detector assemblies 1000, 1000B, and 1000C according to the above embodiments.

The radiation detector assemblies 1000, 1000B, and 1000C according to the above embodiments each have the hardware configuration using a typical computer in which a CPU 80, a read only memory (ROM) 82, a random access memory (RAM) 84, a hard disk drive (HDD) 86, an I/F unit 88, and the corresponding radiation detector 10, 10B, or 10C are mutually connected by a bus 90.

The CPU 80 is an arithmetic unit that controls the overall processing of each of the radiation detector assemblies 1000, 1000B, and 1000C. The RAM 84 stores data necessary for various processings performed by the CPU 80. The ROM 82 stores a program and the like for implementing the various processings performed by the CPU 80. The HDD 86 stores the data stored in the storage 14 described above. The I/F unit 88 is an interface for connecting to an external device or an external terminal via a communication line or the like to transmit/receive data to/from the external device or the external terminal connected to the radiation detector assembly.

A program used to implement the processing executed by each of the radiation detector assemblies 1000, 1000B, and 1000C of the above embodiments is incorporated in advance in the ROM 82 or the like to be provided.

Note that the program executed by each of the radiation detector assemblies 1000, 1000B, and 1000C of the above embodiments may be recorded and provided in a computer-readable recording medium such as a CD-ROM, a flexible disk (FD), a CD-R, or a digital versatile disk (DVD) in a file format that can be installed to or executed by the radiation detector assemblies.

Alternatively, the program executed by each of the radiation detector assemblies 1000, 1000B, and 1000C of the above embodiments may be stored on a computer connected to a network such as the Internet and downloaded via the network to be provided. Yet alternatively, the program used to implement the above processings executed by each of the radiation detector assemblies 1000, 1000B, and 1000C of the above embodiments may be provided or distributed via the network such as the Internet.

The program used to implement the above various processings executed by each of the radiation detector assemblies 1000, 1000B, and 1000C of the above embodiments is configured to generate each of the units described above on a main storage.

The various information stored in the HDD 86, namely the various information stored in the storage 14, may be stored in an external device (such as a server). In this case, the external device and the CPU 80 may be connected via the I/F unit 88.

The radiation detector assemblies 1000, 1000B, and 1000C are applicable to various apparatuses detecting radiation L. The radiation detector assembly 1000 can be applied to a survey meter, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detector comprising:
   a first scintillator that converts radiation into light;
   a second scintillator that converts radiation into light and has higher density than the first scintillator; and
   a photoelectric conversion element that is provided between the first scintillator and the second scintillator, and includes a photoelectric conversion layer converting light into electric charge, wherein
   an amount of emitted scintillation light per unit energy in a sensitive wavelength range of the photoelectric conversion layer in the first scintillator is the same as that in the second scintillator.

2. The detector according to claim 1, wherein a density ratio of the second scintillator to the first scintillator is 2 or larger and 8 or smaller.

3. The detector according to claim 1, wherein the first scintillator is disposed upstream of the second scintillator in an incident direction of the radiation.

4. The detector according to claim 1, wherein the first scintillator and the second scintillator have different emission spectra.

5. The detector according to claim 1, further comprising a reflective layer that is provided on at least one of a side of the first scintillator opposite to a side on which the photoelectric conversion element is provided, and a side of the second scintillator opposite to a side on which the photoelectric conversion element is provided, and transmits at least a part of the radiation as well as reflects at least a part of the scintillation light.

6. The detector according to claim 1, wherein the photoelectric conversion layer is an organic photoelectric conversion layer.

7. The detector according to claim 1, wherein the radiation is a β ray.

8. The detector according to claim 1, wherein the photoelectric conversion layer is disposed between a pair of electrode layers.

9. The detector according to claim 8, wherein the electrode layers transmit the radiation and the scintillation light.

10. A radiation detector assembly comprising:
    the radiation detector according to claim 1; and
    a derivation unit configured to derive detected energy of radiation on the basis of an output signal of electric charge converted by the photoelectric conversion element.

11. A radiation detector comprising:
    a first scintillator that converts radiation into light;
    a second scintillator that converts radiation into light and has higher density than the first scintillator;
    a photoelectric conversion element that is provided between the first scintillator and the second scintillator, and includes a photoelectric conversion layer converting light into electric charge; and
    a light attenuating layer disposed at least between the first scintillator and the photoelectric conversion element or between the second scintillator and the photoelectric conversion element, and partially attenuates the amount of scintillation light.

12. The detector according to claim 11, wherein a density ratio of the second scintillator to the first scintillator is 2 or larger and 8 or smaller.

13. The detector according to claim 11, wherein the first scintillator is disposed upstream of the second scintillator in an incident direction of the radiation.

14. The detector according to claim 11, wherein the first scintillator and the second scintillator have different emission spectra.

15. The detector according to claim 11, further comprising a reflective layer that is provided on at least one of a side of the first scintillator opposite to a side on which the photoelectric conversion element is provided, and a side of the second scintillator opposite to a side on which the photoelectric conversion element is provided, and transmits at least a part of the radiation as well as reflects at least a part of the scintillation light.

16. The detector according to claim 11, wherein the photoelectric conversion layer is an organic photoelectric conversion layer.

17. The detector according to claim 11, wherein the radiation is a β ray.

18. The detector according to claim 11, wherein the photoelectric conversion layer is disposed between a pair of electrode layers.

19. The detector according to claim 18, wherein the electrode layers transmit the radiation and the scintillation light.

* * * * *